Feb. 23, 1960    D. E. WIEGAND    2,926,313
ELECTROMOTIVE VIBRATOR AND OSCILLATOR SYSTEMS
Filed April 12, 1955    5 Sheets-Sheet 1
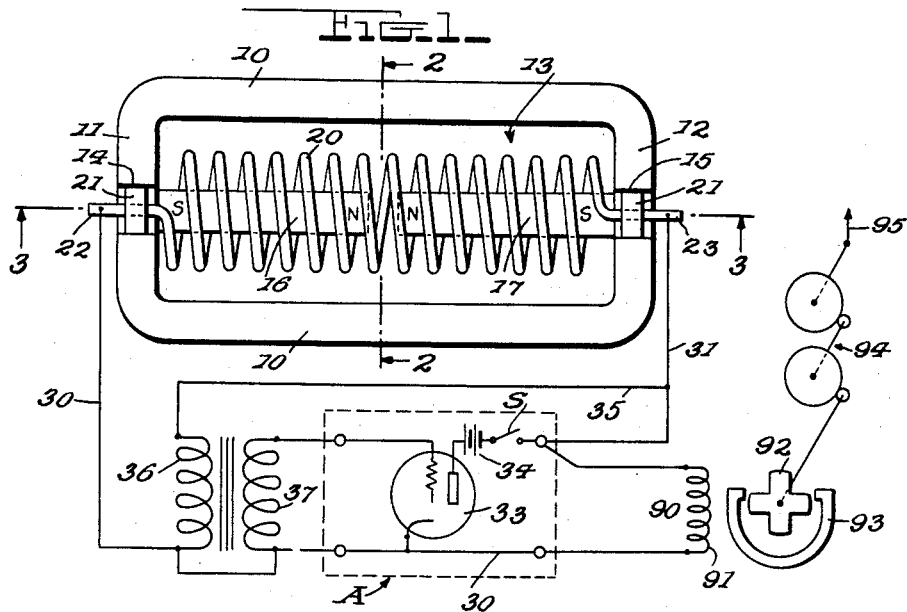
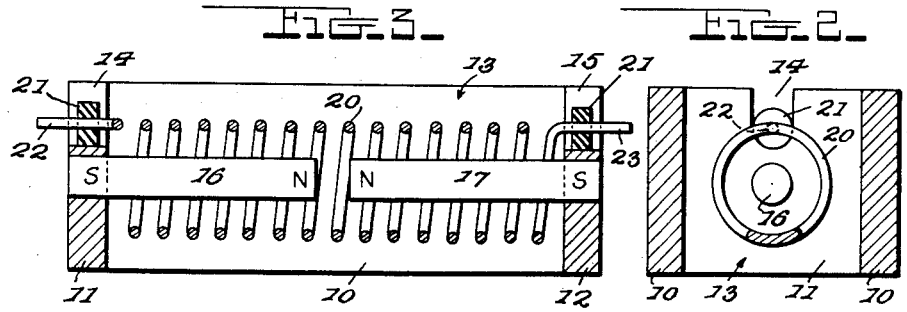
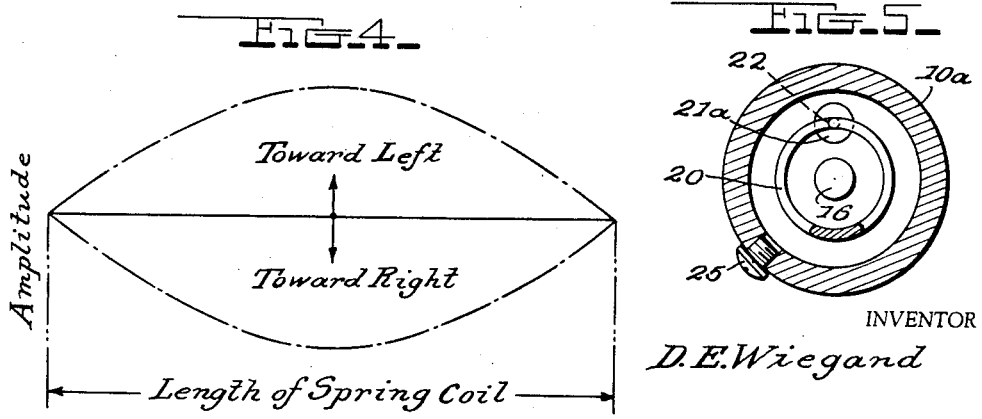
INVENTOR
D. E. Wiegand
BY
ATTORNEYS Feb. 23, 1960  D. E. WIEGAND  2,926,313
ELECTROMOTIVE VIBRATOR AND OSCILLATOR SYSTEMS
Filed April 12, 1955  5 Sheets-Sheet 2
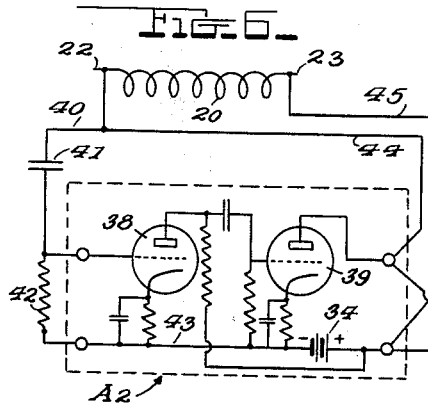
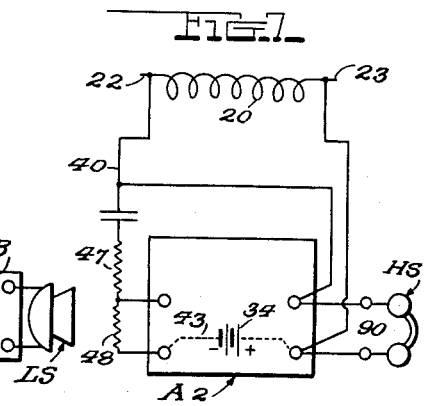
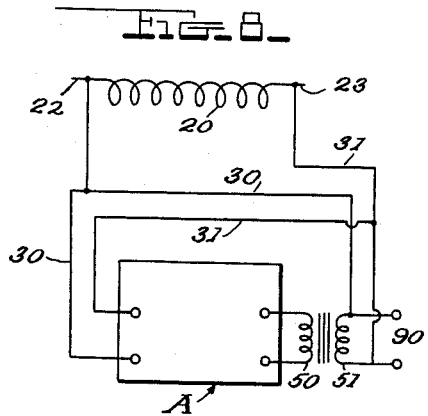
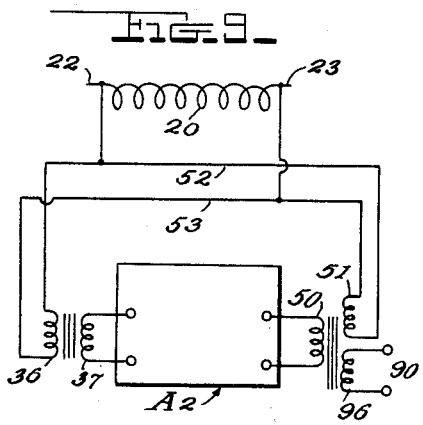
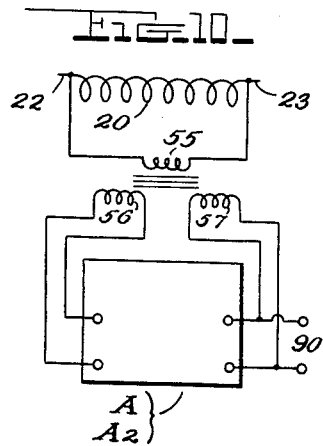
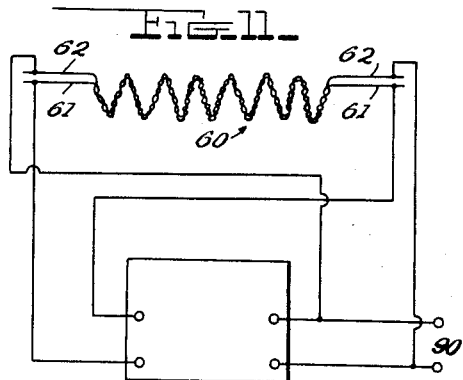
INVENTOR
D. E. Wiegand
BY Mason, Porter, Diller & Stewart,
ATTORNEYS

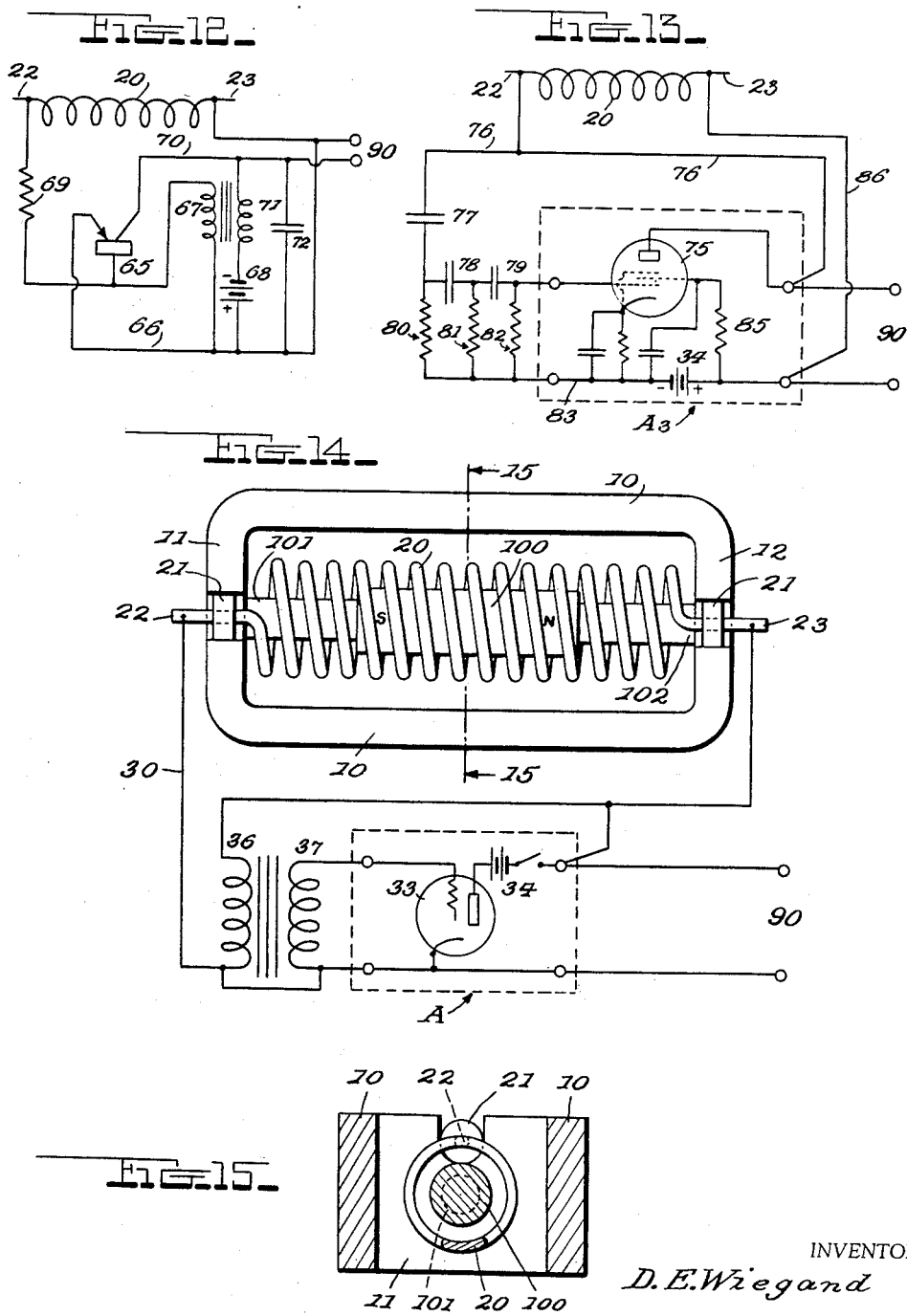

Feb. 23, 1960          D. E. WIEGAND                2,926,313
          ELECTROMOTIVE VIBRATOR AND OSCILLATOR SYSTEMS
Filed April 12, 1955                          5 Sheets-Sheet 4
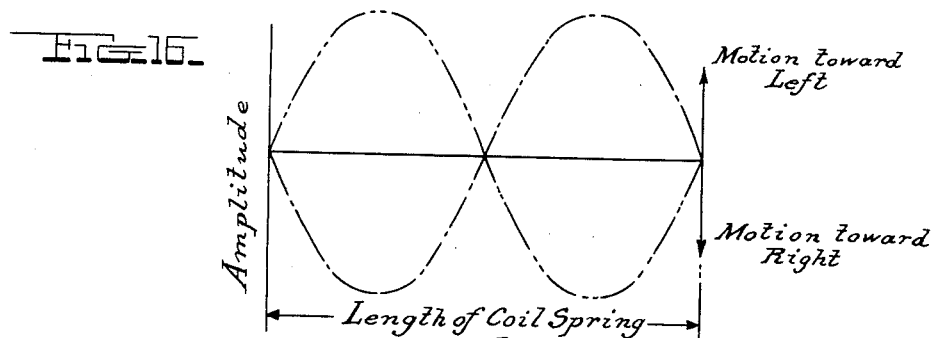
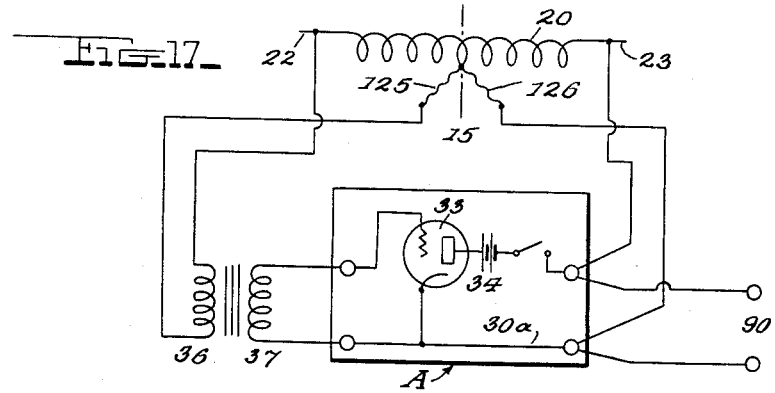
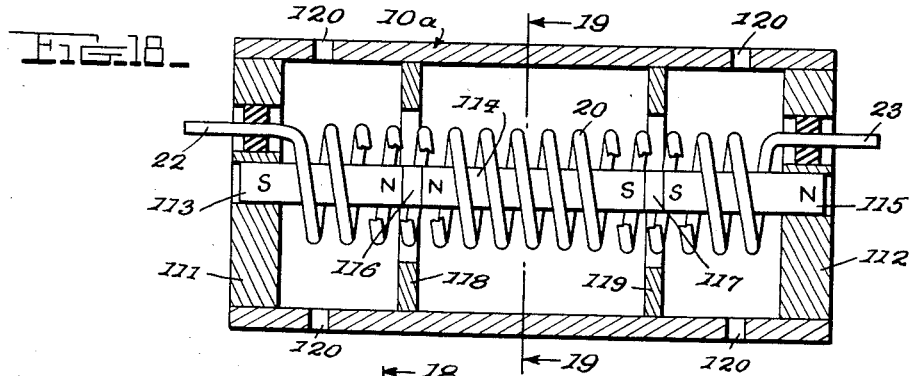
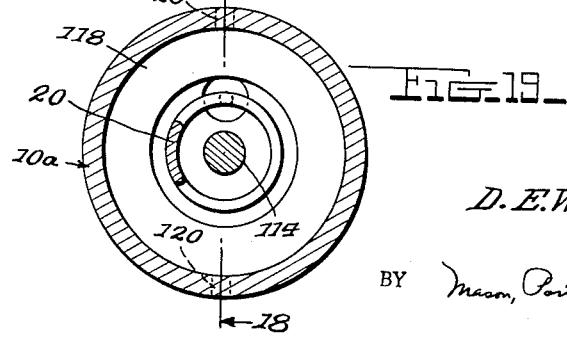
INVENTOR
D. E. Wiegand
BY Mason, Porter, Diller & Stewart
ATTORNEYS Feb. 23, 1960     D. E. WIEGAND     2,926,313
ELECTROMOTIVE VIBRATOR AND OSCILLATOR SYSTEMS
Filed April 12, 1955     5 Sheets-Sheet 5
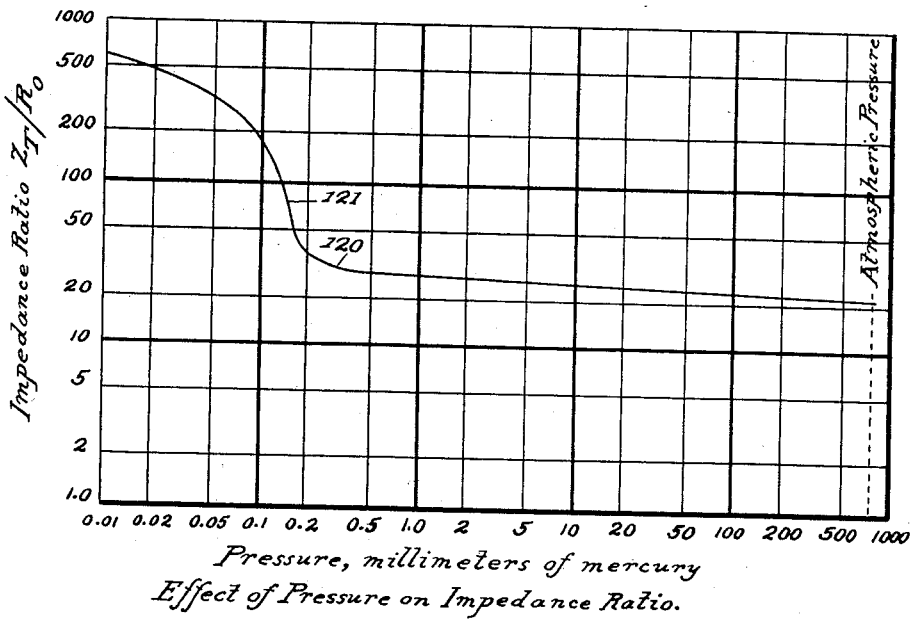
Effect of Pressure on Impedance Ratio.
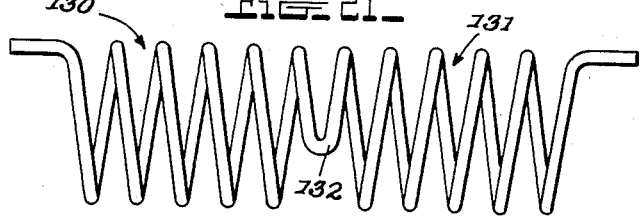
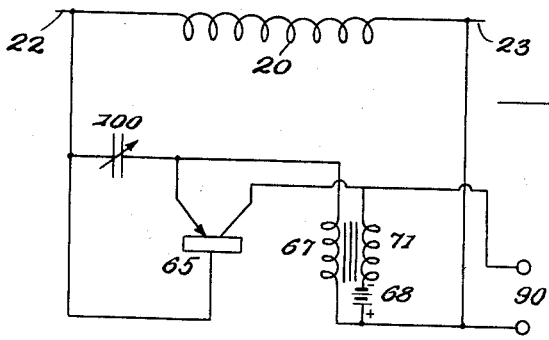
INVENTOR
D. E. Wiegand
BY Mason, Porter, Diller & Stewart,
ATTORNEYS United States Patent Office 2,926,313
Patented Feb. 23, 1960

2,926,313

ELECTROMOTIVE VIBRATOR AND OSCILLATOR SYSTEMS

David Edgar Wiegand, Villa Park, Ill., assignor, by mesne assignments, to Elgin National Watch Company, Elgin, Ill., a corporation of Illinois Application April 12, 1955, Serial No. 500,771

53 Claims. (Cl. 331—154)

This invention relates to systems and structures effective as oscillators or generators of alternating electric currents, and more particularly useful for such currents in the low and middle audio frequency range, namely from about 20 cycles to about 1000 cycles per second.

Stabilized sources in this range are of great importance in a wide variety of time-measuring applications since the stabilized signal can be used directly to operate a synchronous motor running at some convenient frequency-determined speed which may then be geared down to provide the desired timing function. The natural frequencies obtainable from such stabilizing devices as quartz crystals or magnetostriction oscillators are above the stated range and are much too high for direct driving application to a motor. When these high frequency stabilizing elements are used to provide mechanical motion, it is necessary to apply e.g. electronic frequency division to the stabilized signal before it can be applied to a synchronous motor or similar electromechanical transducer. In applications where permissible weight, space or power drain is limited, the additional vacuum tubes and their associated components in the frequency dividing apparatus make the use of these high frequency standards impractical. The space, weight, and power drain requirements of the device of this invention are but a small fraction of those in such high frequency elements with frequency dividing equipment and thus this device can be used in many applications in which such high frequency elements would not be feasible.

A feature of the invention is the provision of a frequency-stabilized source of alternating current at a sufficiently low frequency for direct employment with a synchronous motor or similar electro-mechanical device.

Another feature is the provision of a frequency-stabilized source of alternating current, of compact size and small weight, and requiring only a very small amount of electrical power for its operation.

A further feature is the provision of an electro-mechanically oscillating element in which the electro-mechanical coupling is inherent in the device and occasions at most a negligible disturbance of the free vibration of the mechanical element.

Another feature is the provision of a frequency-stabilized electromechanical source of alternating current capable of generating at its mechanically determined natural frequency a voltage sine wave of high purity.

A further feature is the provision of an electro-mechanical vibrating arrangement having an extremely high and sharp increase in impedance at the resonant frequency.

A feature is the provision of an electro-mechanical vibrating arrangement having no external component of motion.

A feature of the invention is the provision of a structure having means for producing a radial magnetic field effect, and having a loop or turn of conductive material movable in the magnetic field and mechanically supported in an elastic manner so that the movements are longitudinal mechanical vibrations at an inherently determined stable rate, and whereby the vibrations are accompanied by the production of electrical voltage effects between the ends of the loop or turn.

With these and other features as objects in view, as will appear in the course of the following description and claims, illustrative examples of practice are set forth in the accompanying drawings, in which:

Figure 1 is a top view of one form of an electromechanical oscillator unit according to this invention, with associated electric circuits shown conventionally.

Fig. 2 is a transverse section on line 2—2 of Fig. 1.

Fig. 3 is a horizontal section on line 3—3 of Fig. 1.

Fig. 4 is a graphic diagram of the amplitudes of motions along the length of the oscillating element of Figs. 1, 2 and 3.

Fig. 5 is a view corresponding to Fig. 2 of a first modified form of structure.

Fig. 6 is a conventionalized diagram of another, modified circuit system.

Fig. 7 is a conventionalized diagram of a further modified circuit system.

Fig. 8 is a conventionalized diagram of a further modified circuit system.

Fig. 9 is a conventionalized diagram of a further modified circuit system.

Fig. 10 is a conventionalized diagram of a further modified circuit system.

Fig. 11 is a conventionalized diagram of a further modified circuit system, with a modified coil.

Fig. 12 is a conventionalized diagram of a further modified circuit system, employing a transistor.

Fig. 13 is a conventional diagram of a further modified circuit arrangement with a high-gain amplifier.

Fig. 14 is a top view of a further modified form of structure, with a conventionalized circuit system.

Fig. 15 is a section substantially on line 15—15 of Fig. 14.

Fig. 16 is a graphic diagram of the amplitudes of motions along the length of the oscillating element of Figs. 14 and 15.

Fig. 17 is a conventionalized diagram of a modified circuit system employable with the oscillation coil structure of Figs. 14 and 18, with employment of electrical connections to the central or node point.

Fig. 18 is a longitudinal section of a further form of structure, substantially on line 18—18 of Fig. 19.

Fig. 19 is a transverse section on line 19—19 of Fig. 18.

Fig. 20 is a graphic diagram of behavior of the device at reduced pressures.

Fig. 21 shows a modified coil in which the ends are reversely wound.

Fig. 22 shows a conventionalized diagram of a further modified circuit system.

Electrically driven tuning forks of suitable configurations can be used in part of the frequency range provided by devices of this invention, but several important advantages are obtained through the use of this device in preference to the use of the tuning fork devices. In electrically driven tuning forks, vibration of the fork is presently maintained through the use of carbon buttons and/or core-and-coil elements suitably coupled to the vibrating tines of the fork. These extraneous elements mechanically load the vibration of the fork and therefore reduce the frequency stability significantly below that of the fork by itself. Furthermore, the wave form of the electrical voltage is distorted from that of the harmonic motion of the fork alone and, in applications requiring a sinusoidal voltage, electrical filters must be used. In the vibrating-coil oscillator of this invention, electrical coupling to the mechanically vibrating coil is inherent in the device, and the disturbance of the natural frequency of vibration of the spring is negligible. Also, the voltage output of this device is inherently of very low distortion and does not require filtering even in critical applications.

The tuning fork has an inherent position error which precludes its use as a highly stabilized frequency source in applications in which the orientation of the fork relative to the earth's gravitational field is likely to be changed—such as in portable or mobile apparatus. This error occurs through the varying pendulum effect on the tines as the orientation of the axis of the tuning fork is varied from vertically down, through horizontal, to vertically up. The frequency of vibration of the present device is independent of its orientation. A further feature of this invention is, therefore, the provision of a stable frequency source having no position error.

In the electrically driven tuning fork, it is necessary to use separate driving and feedback or pickup devices. The separate elements are required because of the relatively small ratio of on-resonance/off-resonance impedance of a single core-and-coil element, coupled to the vibration of the tines. In the present vibrating-coil device this critical ratio may be as high as several hundred. This high impedance ratio makes possible feedback circuits of great simplicity.

The oscillator unit of Figs. 1, 2 and 3 can be designated as a half-wave oscillator. A standing wave is set up, having nodes at each end of the coil, so that the distance therebetween constitutes a half-wave length of vibration.

In Figs. 1 and 2, a magnetic yoke structure, of high-permeability magnetic material such as soft iron or mild steel, has the longitudinal legs 10 and the ends 11, 12 connected together and surrounding a central space 13. The ends 11, 12 have notches 14, 15. Two identical permanent magnets 16, 17 of cylindrical shape are respectively secured in the yoke ends 11, 12, and extend coaxially at the center of the yoke space 13, with their adjacent ends spaced to provide a magnetic gap. The magnets are so positioned that such adjacent ends are of like polarity, e.g. both being north as shown by the legends in Fig. 1: correspondingly the outer ends engaged with the yoke ends 11, 12 are south. A helical spring 20 is formed of an elastic electrically conductive material of low magnetic remanence; hard copper, beryllium copper, tungsten, for examples, have been found satisfactory for devices of very high critical impedance. Bushings 21 are securely seated in the notches 14, 15 and have apertures tightly receiving the longitudinally projecting ends 22, 23 of the spring 20: in this form, at least one of the bushings 21 is of insulating material so that impulsing current can be supplied to the coil 20.

It is evident from the arrangement of parts and the direction of magnetization of the permanent magnets that a magnetic flux extends outward from the magnet surfaces toward the yoke legs 10, the magnetic strength within the space 13 being maximum in the region of the illustrative north poles at the center of the structure and gradually decreasing to zero at the two magnet ends attached to the yoke. This radial flux passes through all the turns of the spring member 20 in the same direction. When the coil is vibrating in the direction of its length, the turns move in the magnetic field and voltage effects are generated and appear across the ends of the coil, in the form of an alternating voltage at a frequency identical with the rate of mechanical vibration of the coil turns. Such vibrations may be produced mechanically by abrupt mechanical shocks, e.g. by plucking at a turn of the coil or by a blow upon the yoke end so that the coil turns remain relatively in place by inertia, or by a brief direct current pulse through the coil; and the alternating pulse then continues to be exhibited during the mechanical decrement of the coil vibrations. Upon plucking, for example, the initial voltage effects may be very complex, by the presence of high frequencies which are essentially upper harmonics; but these complex components die out rapidly as compared with the fundamental frequency exhibited by the coil system as a whole. The presence of such upper harmonics, however, can be usefully employed when it is desired to produce percussive effects in an electronic organ, in chimes, etc. After decay of such upper harmonics, the continued alternating voltage effects at the fundamental frequency permit employment with a low-power transducer such as an earphone, for comparing with another frequency such as the sound of a piano string, in tuning.

Furthermore, if impulses are employed to maintain the vibration, in synchronism or resonance therewith, the device becomes a stable source of voltage effects which are harmonic or sinusoidal in form and have the frequency of the mechanical system and will, when the impulsing energy content is equal to the decremental energy loss, provide such voltage effects of constant amplitude. Thus, if an electric current is caused to flow through the spring member, the magnetic field effects produced thereby react with the said flux to generate mechanical forces which displace the turns from their neutral or natural positions. For example, if an electric current flows from the left end to the right end of the spring in Figure 1 (assumed herein to be the positive direction), all the turns will be moved to the left from their normal position. Since the radial flux is a maximum near the center of the spring, and since the center turns are most free to move, the leftward displacements will be greatest at the center turns and will gradually decrease for the turns toward the two ends of the spring. With a current in the opposite or negative direction, the turns move toward the right, with like relative displacements.

If an alternating current is caused to flow in the spring, it is evident that a mechanical vibration of the spring will result in synchronism with the current. If the current is at the frequency of mechanical resonance of the spring, a large amplitude of vibration will result after successive impulsings, for a small steady value of the alternating current. The dynamic characteristics of the spring cause the vibration of any point on the spring to be sinusoidal with time. Furthermore, the amplitude of vibration of the center turn is a maximum and for turns at either side of the center the amplitude of vibration tapers off in a sinusoidal manner. This sinusoidal space variation is shown graphically in Figure 4, in which the abscissas represent distances along the length of the spring 20, the ordinates above the horizontal reference line represent the amplitudes of leftward motion of the corresponding parts of the spring upon a positive half-wave of exciting or impulsing current, and the ordinates below the reference line represent the amplitudes of rightward motion of corresponding parts of the spring upon a negative half-wave of exciting or impulsing current. Thus a mechanical harmonic or sinusoidal motor action is produced.

In addition to this motor action, the movements of the turns of the spring 20 within the magnetic field, with cutting of the flux, cause the converse generator action to occur. For example, when the spring is set in vibration in the above fashion by any means, its ends exhibit a potential difference which varies sinusoidally at the frequency of the mechanical vibratory rate of the spring 20. When the spring 20 is caused to vibrate by an alternating current in resonance with the natural mechanical frequency of the spring 20, a back voltage is developed which results in a high impedance at the resonant frequency.

It is presently preferred to form the magnetic yoke as a hollow cylinder with closing ends, as shown in Figs. 5, 18 and 19 where the legs 10 of Figs. 1, 2 and 3 have been connected to form the enclosing shell 10a. With this form, the coaxial positioning of the permanent magnets 16, 17 within the coil 20 and the shell 10a, gives a great uniformity in the magnetic flux and field effects and a relatively greater radial flux effect for given sizes and materials of the permanent magnets and coil so that the electromechanical coupling assures a greater amplitude of vibration for a given exciting current energy. The entire yoke structure is preferably made gas tight by appropriate seals 21a through which the coil ends 22, 23 pass and may be insulated thereby. The sealable outlet 25 (Fig. 5) is employed for evacuating the interior space of the yoke in order to reduce the gas friction or damping upon the moving parts of the spring 20. If desired to avoid pressure differential, the space may be wholly or partly filled with a gas of low viscosity. The reduction of damping thus effected reduces the required energy input for exciting or impulsing, and the resulting higher effective "Q" value increases the stability of the frequency of vibration.

Steady vibration of the spring 20 in the unit can be maintained through the use of a suitable alternating current source whose frequency can be controlled by the device itself. Such may, for example, be a stable amplifier. As shown in Fig. 1, the ends 22, 23 of the coil 20 are connected by conductors 30, 31 to the output of a conventionally shown amplifier A, whose input is controlled by a regenerative feedback. Thus conventionalized, the electron tube 33 has its cathode connected to conductor 30, and its anode connected through the plate battery 34 and a switch S to conductor 31. Conductor 30 can thus be regarded as providing a reference potential. The branch conductor 35 from conductor 31 leads to the primary 36 of a phase-shifting transformer whose secondary 37 is connected to the conductor 30 and to the grid of the electron tube. The other primary terminal is connected to conductor 30. Upon closure of the switch S, a current pulse causes an initial movement of the spring 20 and this spring begins vibrating at its natural frequency. The generated pulses appear between conductors 35, 30, and pulse potential effects at the grid of the tube 33 condition an amplifier response at the frequency mechanically determined by the spring 20: noting that the amplifier is always in step with the spring 20, the voltage at the grid can be regarded as derived from a feedback system by a phase controlling device which provides regenerative feedback.

In Fig. 1, the delivery of a positive voltage pulse to the grid of the electron tube produces an increase of current flow through the tube 33 and thence from the anode through the external anode-cathode circuit including the plate battery. This current increase causes an increased voltage drop across an impedance such as the load device 91 and the coil 20 connected in series with the source 34 of anode or plate current, and the potential difference between the anode and the cathode is correspondingly reduced. Thus there is a phase reversal between grid voltage and plate voltage, so that when the first rises the latter drops; and a converse effect that when the first drops the latter rises. The illustrative circuit of Fig. 1 is of a conventionalized use of a single electron tube with phase-shifting means, being the transformer, to correct this degenerating effect. It will be understood that with amplifying devices which do not have inherent phase reversal, no such phase-shifting may be required. For example, in Fig. 6, an amplifier A2 is conventionally shown, with two electron tubes 38, 39; the conductor 40 from the coil terminal 22 leads through a condenser 41 to the grid of electron tube 38: this grid being connected through a grid resistor 42 to the reference conductor 43. The plate battery 34 is connected to conductor 43 and to a first outlet terminal of this amplifier A2. The plate of electron tube 39 is connected to the other output terminal and thence by conductor 44 to the terminal 22 of coil 20. The conductor 45 leads from the coil terminal 23 to the first output terminal. Appropriate condensers and resistors are employed for the conventionalized amplifier A2, with the two electron tubes operating essentially in cascade, so that an increase of voltage at the grid of electron tube 38 produces a decreased current flow from the plate of electron tube 39, and consequently an increase in plate potential of electron tube 39. Particularly at low frequencies and with a coil 20 of wire of relatively large diameter, the vibrator unit is inherently a low impedance device, and the illustrated transformer (Fig. 1) is an example also of an impedance matching arrangement.

A like employment of a conventionalized amplifier A2 is shown in Fig. 7, in which an increase of voltage at the input is accompanied by increase in voltage at the output; the conductor 40 from the terminal 22 of the coil 20 leads through two resistors 47, 48, in series, to the reference conductor 43 within the amplifier A2. A connection from the midpoint of resistors 47, 48 leads to the second input terminal.

In Fig. 8, the amplifier A is of phase-reversing type as in Fig. 1. The terminals 22, 23 of the coil 20 are connected by conductors 30, 31 to the input terminals of amplifier A. The output terminals of the amplifier A are connected to the primary 50 of a transformer whose secondary 51 is connected with conductors 30, 31 in phase-reversal arrangement. Such transformer connections also have an isolation function: and it is preferred to have the windings of the transformer so related that impedance matching is provided.

In Fig. 9, a non-phase-reversal amplifier A2 (for example as in Fig. 6) is arranged with the conductors 52, 53 leading from the coil terminals 22, 23 to the primary 36 of an input transformer whose secondary 37 is connected to the input terminals of amplifier A2. The output terminals of the amplifier A2 are connected to the primary 50 of an output transformer of which a secondary 51 is connected to conductors 52, 53 for delivering current at the desired phase relation through the coil 20. A second secondary winding 96 is arranged to supply power to terminals 90 and thus to a load device, for example a synchronous motor. This arrangement electrically isolates both the input and the output sides of the amplifier from the coil 20, and assures accurate impedance matching. With this arrangement, for example, the effects of transformer impedance voltage drops in the driving circuit do not appear in the voltage fed back to the input of the amplifying device A2: so this provides a lock-in operation for preventing oscillation at some frequency other than the natural mechanical frequency determined by the spring 20, such as might be otherwise induced by internal characteristics of the amplifying device A or A2, the transformers, the external input, etc.

The circuit arrangement of Fig. 10 has a transformer with three windings. The terminals 22, 23 of the coil 20 are connected to a winding 55. A winding 56 is connected to the input terminals of the amplifier A. A winding 57 is connected to the output terminals of the amplifier. This arrangement, with the three windings upon the same conventionally illustrated core, is likewise useful in determining proper phase and impedance relationships, without parasitic frequency effects being present and imposing frequency-selecting factors upon the coil 20. It will be noted that an amplifier A as in Fig. 1 or an amplifier A2 as in Fig. 6 can be employed with the circuit of Fig. 10 by merely reversing the relative connections to either of the windings 56 or 57.

The arrangement of Fig. 11 has a modified mechanically vibrating coil 60, formed for example by twisting two wires together, with insulation between them provided for example by individual insulations on these wires, and then winding the twisted pair to form a helical coil 60 which has the ends 61, 62 of the individual wires brought out of the magnetic yoke in insulated relation thereto. The ends 61 of one wire are connected to the input of the amplifier A; the ends 62 of the other wire are connected to the output thereof. In the prior forms, the resistance drop resulting from the flow of alternating current from the amplifier and through the vibrating coil 20 appears as a voltage component fed back to the input of the amplifier A or A2, to modify the induced voltage that results from the motion of the coil turns in the magnetic field. Such may in some cases cause or permit oscillation of the electrical system at other than the natural frequency of the coil. In the bi-filar coil of Fig. 11, the independence of the coil circuit which receives the impulsing or exciting current of the amplifying output, from the coil circuit in which is generated a voltage by the mechanical motion with delivery of such generated voltage to the amplifier input, permits obtaining the proper polarity of electrical connections regardless of whether or not there is phase reversal within the amplifier: for example, if a particular assembly exhibits degeneration rather than regeneration, reversal of the connection of one of the components of the bi-filar coil corrects the behavior.

In Fig. 12 is shown a circuit arrangement employing a junction-type transistor 65. One terminal of the transistor is connected to reference conductor 66 and thus to a terminal of the transformer winding 67, to the positive terminal of the battery 68, and also to the terminal 23 of the coil 20. The other terminal 22 of the coil is connected through resistor 69 to the body of the transistor element and thence to the other terminal of transformer winding 67. The third terminal of the transistor is connected by conductor 70 through the winding 71 of the transformer to the negative terminal of the battery 68. A condenser 72 is connected between conductors 70 and 66. With this arrangement, mechanical vibration in the coil 20 produces a potential difference across the transistor 65, which results in a pulse appearing across the transformer winding 71: and therewith an impulsing current is applied through the terminals 22, 23 of the coil 20 for maintaining vibration thereof. It will be noted that the transformer 67, 71 can have a phase-shifting function.

Fig. 13 shows employment of a conventionalized amplifier A3 having a high gain electron tube such as a pentode or beam power tube 75. The terminal 22 of coil 20 is connected by conductor 76 through the series condensers 77, 78, 79 to an input terminal of the amplifier A3 and thus to the control grid of tube 75. The shunt resistors 80, 81, 82 are connected between intermediate points of the series condenser system and the reference conductor 83. The values of the condensers 77, 78, 79 and resistors 80, 81, 82 are selected to provide the desired phase-shifting at the frequency of the oscillations, and one or more of the same may be variable in value for establishing accurately the phase-shifting desired. The plate battery 34 is connected to conductor 83 and to an output terminal, with a connection by resistor 85 to the screen grid of the tube 75. The plate of tube 75 is connected to another output terminal and thus to conductor 76, and thus to coil terminal 22: coil terminal 23 is connected by conductor 86 with the positive terminal of the battery 34. The tube is shown with conventional connections by resistors and condensers for cathode biasing and for the passage of spurious frequencies.

The various arrangements permit the employment of the potential or voltage effect, exhibited by the vibrating coil, for controlling a device which delivers an adequate current, in proper phase relation, for exciting the coil into maintained vibration. The simpler arrangements are useful where no inherent phase reversal is present, as with amplifier A2; but it will be understood that the several arrangements are illustrative of those which may be used for impedance and phase control.

In each of these circuit arrangements of Figs. 1 and 6 to 13, the output of the amplifier is also shown as connected to terminals 90. These terminals can be connected to any device responsive to such current, for employment thereof. In Fig. 1, illustratively, the terminals 90 are connected to the winding 91 of a synchronous motor having a rotor 92 cooperating with a permanently magnetized field 93 so that the motor turns at a speed determined by the natural frequency of the coil 20: and the rotor 92 is coupled by a reducing train 94 for moving the hand 95 which thus serves to indicate the integration of the number of current pulses and thus to measure time. In Figs. 6 and 7, as a further illustration of use, the terminals 90 are connected to a transducer such as a head set HS or a loud speaker LS which responds audibly at the frequency of the oscillator coil 20, as an alarm siren, as a component of an electrical organ, etc., noting that a power amplifier B may be interposed to supply the desired wattage or kilowattage to the transducer LS. In Fig. 9, the output terminals 99 are supplied from a transformer winding 96 on the same core with windings 50, 51.

The electromechanical oscillator arrangements above described for Figs. 1 to 13 operate as a half-wave vibrator as explained in connection with Fig. 4. The turns of the coil 20, 60 move together toward the right or left in the respective half-cycles. Therewith there are reactions upon the yoke which cause the same to move in unison. For some purposes, this result is undesirable, for example by reason of behavior upon the yoke support or by reason of a reduction of stability in an amount dependent upon the manner of supporting the yoke. If the yoke is rigidly secured to a massive base member, its reactions may be absorbed by the base member with a damping effect upon the coil and conversely vibrations in the base member are transferred to the coil. If the yoke is mounted dynamically free, for example by a sponge rubber support, it may have a natural vibratory rate determined by its mass and by the elasticity effect of the support.

In the structure shown in Figs. 14 and 15, the coil 20 has a zero net mechanical reaction upon its mounting. In this structure, the magnetic yoke 10 is illustratively as shown in Fig. 1; and the spring coil 20 is the same, with its ends 22, 23 insulatedly supported in the yoke ends 11, 12.

A single permanent magnet 100 is shorter than the length of the helical spring coil 20, and is supported by end spacers 101, 102 of non-magnetizable material such as copper or brass, which are secured in the yoke ends 11, 12. For direct comparison, Fig. 14 shows a circuit arrangement as in Fig. 1, but it will be understood that the circuits of Figs. 6-10, 12 and 13 may be used, or the coil made bifilar and connected as in Fig. 11. Preferably the ends or poles, N, S of the permanent magnet 100 are located at approximately the one-quarter and three-quarter points of the length of the coil spring 20 while at rest.

With this arrangement, the coil turns at the left of the center plane denoted by the section line 15—15 lie in the magnetic flux associated with the south pole S indicated by the legend, mathematically having radially inward vector components of direction, while the coil turns at the right of line 15—15 lie in the magnetic flux associated with the north pole N, with radially outward vector components of direction: and upon motion of such turns they cut these flux lines. If a current flow through the coil 20 from left to right in Fig. 14, assumed to be the positive direction, the magnetic field generated by turns to the left of the line 15—15 will react with the permanent magnet field and produce movement of such turns toward the right, and conversely the field generated by turns to the right of line 15—15 will cause reaction so that such turns move toward the left. The result is a compression of turns of the coil spring 20 toward the center and a separation of the turns near the ends. When the direction of current flow is reversed, the motions of the coil turns are likewise reversed so that there is compression near the ends and expansion at the central region. An intermediate point of the spring remains stationary, which for a symmetrical system is the exact center, illustrated by the line 15—15.

If an alternating current flows in the spring, a symmetrical motion is given to the turns of the spring with a nodal point at the center. The motion of turns at equal distances from the center, but in opposite directions, is at all times equal and opposite. If the spring of Fig. 14 has the same dimensions as that in Fig. 1, the resonant frequency for the Fig. 14 configuration will be twice that of the Fig. 1 configuration. In other words, the configuration of Fig. 14 has its major resonant frequency at the frequency of the second mode of vibration of the spring.

A space diagram indicating the variation of vibrational amplitude along the length of the spring for the Fig. 14 configuration is shown in Fig. 16. In this case the space diagram representing the motion of the spring is in the form of a full sine wave shown by the dash-dot and dash-two-dot curves. Hence the arrangement of Figs. 14 to 16 can be described as a full-wave oscillator.

With this symmetrical type of motion in the spring, the total momentum in the spring turns to the left of the center is exactly equal in magnitude but oppositely directed to that in the turns to the right of center. The total momentum of the total spring, as far as external reaction is concerned, is therefore zero at all times. Therefore, there are no forces of reaction tending to vibrate the yoke as a whole. Elimination of reaction forces in the full-wave vibrator results in some important advantages. The frequency of vibration is found to be independent of the manner of attachment to a base member, and mechanical damping forces caused by transmission of vibration to the base member or by radiation of sound from the yoke member are eliminated. The result is a greater stability of the vibrational frequency and a significant reduction in the power required to maintain the vibration.

Correspondingly, upon mechanical shock, the vibrations which result in the coil are, in general, extremely complex initially and depend upon the manner of application of the shock. Components at other than the frequency determined by the second mode of vibration of the spring decay rapidly. The components of shock-excited vibration will in general, include vibration at the frequency corresponding to the first mode (half-wave) of the spring. However, with the magnetic configuration balanced this first mode vibration will not result in a component of induced voltage at such low frequency. Provided that the shock is not sufficient to cause touching between turns of the coil or touching of one or more turns with the yoke or magnet, whereby non-linear effects are produced as a transient, the phase of the desired steady component of vibration is maintained and there is neither a gain nor a loss of time due to the mechanical shock.

A closed cylindrical yoke structure similar to that of Fig. 5 can be applied to the full-wave oscillator of Figs. 14 and 15. In fact, because of the elimination of losses incident to reaction forces in the full-wave vibrator, much greater gains are obtained when the spring of the full-wave vibrator is operated in a vacuum than for the half-wave vibrator.

In Figs. 18 and 19 is shown a structure in which the hollow cylindrical casing 10a is of magnetizable tubing, in which have been tightly fitted the ends 111, 112 of like material. These ends 111, 112 have axial openings in which are tightly fitted the permanently magnetized cylindrical core elements 113, 115; a third core element 114 is coaxially positioned between the elements 113, 115, with the gaps filled by disk elements or pole pieces 116, 117 of magnetizable material: the elements are of the same external diameter and thus present a composite cylindrical core wherein one end has a south magnetic pole and the other end a north magnetic pole, whereas along the length of the core are a pair of juxtaposed north poles and a pair of juxtaposed south poles. The core elements 113, 114, 115 are of a highly retentive material, and are magnetized before the assembly.

Two focussing or field concentrating rings 118, 119 of magnetizable material are tightly fitted within the casing 10a. By construction, the disk elements 116, 117 and the rings 118, 119 lie in respective planes radial to the core and casing axis, and thus define regions of intense magnetic field effects in directions radial to such axis. The helical spring 20 has projecting ends 22, 23, as before, held tightly and insulatedly in the ends 111, 112; in the illustrated device the helix has a length twice that of the effective spacing of the disk 116 and ring 118 from disk 117 and ring 119, and is so positioned relative thereto that the focussing ring planes are located at one quarter and three-quarters of the length of the helix. In a specific structure, the magnetic core elements 113, 114, 115 are each 0.200 inch in diameter by 0.750 inch long and of commercially available nickel-cobalt alloy of high retentivity, e.g. Alnico V; the disk elements or pole pieces 116, 117 are 0.200 inch diameter by 0.063 inch thick; the spring 20 has 39 turns of 0.010 inch diameter beryllium copper as a helix 0.312 inch internal diameter with the turns originally wound tightly together, the helix being stretched during assembly to an active length of 1.625 inches, the coil ends being parallel to the axis: the yoke or cylindrical casing 10a is of 0.938 inch internal and 1.109 inches external diameters, and 2.563 inches long; the end members 111, 112 are 0.313 inch thick, closely fitted to the yoke externally and to the core elements 113, 115 internally: the focussing rings 118, 119 are 0.063 inch thick and 0.438 inch internal diameter, closely fitted externally in the yoke 10a. The parts 10a, 111, 112, 116, 117, 118 and 119 are of cold rolled steel.

In one series of tests with the described device according to Figs. 18 and 19, the mechanical vibration rate of the spring 20, upon steadying after shock excitation, was 52 cycles per second. The device was provided with small holes 120 so that internal and external gas pressures could balance. It was mounted in a bell jar, which was then evacuated to various pressures. Current from a variable frequency oscillator was supplied to the coil by conductive connection to its ends 22, 23, through a network which allowed the determination of the coil impedance. At each evacuation pressure, the oscillator frequency was carefully adjusted to the natural frequency, employing the full-wave mode of operation as described above, as determined by the maximum voltage effect between the ends of the spring. At the higher, i.e. nearly atmospheric, pressures, the dynamic impedance of the vibrating spring was measured directly. At low pressures, the "Q" factor of the vibrating system was so high that the setting and maintaining of the frequency of the laboratory standard supply oscillator became successively more difficult, and hence at low pressures, the values of dynamic impedance were calculated from measurements of decay time of the free vibration of the coil. The variation of dynamic impedance with sub-atmospheric pressure is shown in Fig. 20, in which the abscissas are logarithmic values of the pressure, in millimeters of mercury; and the ordinates are logarithmic values of the ratio of coil impedance $Z_T$ to the direct current resistance $R_0$ of the coil: this ratio is very nearly the ratio of on-resonance to off-resonance impedance, because the off-resonance impedance, where the vibration is very small, is essentially the direct current resistance of the coil.

The impedance ratio, $Z_T/R_0$, also indicates the increase in terminal impedance if a current at precisely the resonant frequency is supplied to the coil of the unit, first with the coil blocked from vibration, and then with the block removed. Thus, at a pressure of 0.01 millimeter, with the turns of the coil blocked against movement, its impedance was 1.5 ohms, which was its direct current resistance. When the block was removed, the impedance gradually increased, as the vibration built up in amplitude, until a value of 600 times the direct current resistance, or 900 ohms, was reached.

The power input at 0.01 millimeter pressure for a maintained zero-to-peak amplitude of vibration, of the turns at the ¼ and ¾ points of the spring length, equal to one-half the pitch of the spring was $10^{-9}$ watts. A lower amplitude could be and normally would be used, in which case the power input was still lower, roughly $10^{-10}$ watts for one-third the amplitude above.

It is notable, from Fig. 20, that there is relatively little logarithmic graph effect upon impedance ratio, until the pressure has been reduced from atmospheric to about 0.3 mm. Hg around point 120; thereafter there is a rapid rise of impedance as the pressure dropped to about 0.15 mm. around point 121; and thereafter a logarithmically slower increase, approaching an asymoptote at below 0.01 mm. Accordingly, it is preferred to maintain the pressure between about 0.2 and 0.01 mm. with air, and at corresponding pressures for other gases, modified in view of their viscosities relative to air.

The full-wave mode of operation may also be effected by employing a coil as shown in Fig. 21, in which the direction of winding is reversed at the midpoint. When this coil is used in the system of Fig. 1, the two halves 130, 131 of the coil are oppositely polarized upon the passage of current so that their turns move toward or from the center 132 of length. The various circuits, including that of Fig. 17, may be employed for impulsing the coil at its inherent frequency.

An important criterion in judging the stability of an electromechanical vibrator, and its effectiveness in locking-in a feedback system to its own natural frequency, is the change in terminal impedance of the drive coil when an externally applied signal frequency is varied slowly through the natural resonant frequency of the vibrator. The terminal impedance measured at an off-resonance frequency is essentially the direct current resistance of the coil. For an efficient electromechanical vibrating system, the impedance seen at the terminals is much higher when the applied voltage is of the natural frequency of the vibrator. This increase of impedance at resonance results from the induced voltage caused by the large-amplitude motion of the vibrating system at its resonant frequency. In a full-wave vibrator built in accordance with Figs. 14 or 18, the terminal frequency increased by a factor of 20 at the resonant frequency with the device operating at normal atmospheric pressure. When the same unit was placed in an evacuated chamber, the resonant peak was so sharp that the impedance change could not be measured directly. However, an impedance change at resonance by a factor of 600 was calculated from measurements of the free decay time for the vibrating coil. It will be evident to one skilled in the art that important advantages from the standpoint of frequency stability, reliability of lock-in, and lower power requirements result from a resonant device having an impedance change of such high magnitude.

Any of the circuit arrangements shown in Figs. 1, and 6 to 13, for the half-wave oscillator, and the bifilar coil arrangement of Fig. 11, will serve for the full-wave oscillators. In fact, because of the high impedance change shown by the full-wave oscillators, the simplest circuits can provide satisfactory lock-in characteristics.

The central nodal point in the full-wave vibrating spring also makes possible circuits employing electrical connections to this nodal point, without producing mechanical damping or modifying effects. In Figure 17, such a circuit arrangement is shown, with the nodal or central point of the vibrating coil being at the line 15—15, and connected by pigtail connections 125, 126, respectively, to input and output terminals of the conventionalized amplifier A, with inclusion of the transformer 36, 37 at the input side for impedance matching and isolation of input and output circuits and the consequent complete elimination of undesired drop in the feed-back voltage due to resistance. It will be noted that the pigtails 125, 126 can be joined together by the common conductor 30ª extending between the corresponding input and output terminals and extending between the transformer primary and secondary to provide a common ground. With the common ground connection the two pigtails, being joined at both ends, may be replaced by a single pigtail. In either case, IR drops in the pigtail connection are included in the fedback voltage. But with the high dynamic impedances realized by the vibrating coil the effect on lock-in properties and stability is negligible. When sufficient gain is available from the amplifying device 33, a further simplification is possible in the elimination of the input transformer 36, 37. The phases of voltage in the two halves of the coil 20, relative to the center point are opposite and therefore positive feedback results in spite of the phase reversal in the amplifying device. This circuit configuration is a special form of the Hartley oscillator; the voltage drop generated by the flow of the driving current through the resistance of the driving winding portion of the coil is not fed back to the input of the amplifying device A. This is effective for a satisfactory lock-in and frequency maintenance. When the input transformer and the independent pigtails 125, 126 are employed, without the grounding or direct interconnection of the associated amplifier conductors therefrom (e.g. as in Fig. 13), even the voltage corresponding to the current flow through the resistance of the pigtail 126 leading from the amplifier output is not fed back: but it will be understood that separate such connections are not always necessary as for example when the accompanying minor changes are tolerable.

A general description of devices according to this invention is that the unit has a coil spring including free turns located in a magnetic flux field having radial vector components relative to the coil axis, so that mechanical vibrations of the coil in the direction of its length procures generation of electrical voltage effects at the frequency of the coil vibrations; and the system includes means controlled by such voltage effects for delivering impulsing or exciting current to the unit for procuring a change in the magnetic interaction of the coil and the magnetic field whereby to maintain the coil vibration (by an electrical feed-back effect which is regenerative in nature). The illustrative forms show employment of an axial permanent magnet and a non-permanent magnetic yoke; but such forms are not restrictive.

Fig. 22 shows a further circuit arrangement employing the mechanically vibrating coil 20 and a junction-type transducer or transistor 65, in which the high impedance change of the mechanical vibrator is effective in a resonance circuit having the same frequency, with a frequency-adjusting tuning condenser 100, for procuring a high transduction effect, which in conjunction with the transformer 67, 71 enables a low voltage battery 68 to supply energy to the system and attain higher voltage alternating current effects at the effective output terminals 90. This circuit can likewise be employed with other units, such as those of Figs. 14, 18 and 21.

Illustrative of unit structure is a unit made as shown in Figs. 1–3 of No. 40 commercial copper wire and providing a coil about ¼ inch in diameter with 15 turns and having a resistance of about 1.6 ohms: the magnets 16, 17, were of circular section 3/16 inch in diameter and ¾ inch long. The yoke was formed of strap iron 1/16 inch thick by ½ inch wide, the interior dimensions being ½ inch high, ¾ inch wide, and 2¼ inch long. The coil was made of copper wire insulated with a heavy resin coating having the trade name Formex (a commercially available wire was used): the wire was uniformly coiled with close winding: the turns were separated by tension between the ends, in assembly. The unit had a natural frequency about 224 cycles per second under the "half-wave" mode of operation.

A structure as in Fig. 11, employing the same dimensions of yoke and magnets, had a coil formed of like insulated No. 40 copper wire by first twisting two such wires together, stretching for stiffness, and then winding to provide 15 turns and an inside diameter of about 1/4 inch. Upon self-excitation as described, in the "half-wave" mode, the frequency was 201.5 cycles per second.

Another structure as in Fig. 18, without the external connecting yoke, had a single magnet (3/16 inch diameter and 3/4 inch long) supported with its poles at approximately 1/4 to 3/4 points of the length of the coil. The active coil length was 1 3/4 inches, and it was formed of 20 turns of 0.010 inch diameter bare Phosphor-bronze wire with a coil diameter slightly over 1/4 inch. A double pigtail connection was provided to the center of its active length. The frequency at the "full-wave" mode of operation was 107.5 cycles per second. Another coil of 0.010 inch diameter beryllium-copper wire, with 34 turns and the same active coil length, slightly larger in coil internal diameter, operated with the same magnet, without yoke, under the "full-wave" mode, at 98 cycles per second. These forms are notable in the behavior of the coil and magnet in the absence of a yoke for controlling the direction and strength of the field. They are useful where there is no adjacent magnetized body or conductor carrying a field-modifying current, for example where a single unit is needed, ample energy is available for maintaining the motion, and a low impedance ratio is satisfactory. However, if several units must be placed together, as in an electric organ, the magnetic interlinking may be disturbing to the feasible purity of response from any given unit.

A further structure of a unit as in Figs. 1–3 had a coil 0.080 inch diameter and 0.360 inch long with 20 turns. The magnets 16, 17 were of circular section 0.050 inch diameter and 0.140 inch long, with the inner ends separated 0.100 inch. The total length, including the yoke, was 0.440 inch and the overall width across the yoke legs 10, 10 was 0.180 inch. The coil was of copper wire as above, insulated, winding with a resin coating having the trade name Formex (a commercially available wire was used): the wire was initially stretched for stiffness and then uniformly coiled. The unit had a natural frequency about 350 cycles per second under the "half-wave" mode of operation.

Another coil for this smaller yoke and magnet system was made of beryllium copper wire of 0.003 inch diameter, without insulation, with 56 turns in the same active length. The natural frequency was 275 cycles per second under the "half-wave" mode of operation.

Where transformer couplings are employed, with phase control, it is feasible to place the transformer windings upon one or more legs of the yoke. In such cases, for example, the yoke serves both as a closed transformer core and as the return path for the magnet flux.

Coils with differing number of turns, of differing materials, of differing wire diameters, and of differing coil diameters, have been made. In general, it has been found that the natural operating mechanical frequency increases with a harder material for the wire, with use of a shorter wire wound in fewer turns, with the use of wire of larger diameter, and with a smaller diameter of the coil.

It has been found that if the frequency of natural vibration is not precisely that desired, the frequency can be adjusted or regulated by rotating the coil ends relative to one another to reduce coil diameter. This operation acts to increase the frequency of vibration. The frequency can be decreased by relative rotation of the ends to increase the coil diameter.

In general, the length of the coil between the junctions with ends 22, 23 should be correlated to the desired frequency, in order that a low helical angle can be preserved but without actual contact of the turns in the event of shock excitation.

Such devices have been designed for working at a frequency of 60 cycles per second, and have then been actually adjusted for operation at 58 cycles per second or 62 cycles per second. In practice, devices have been designed and operated at frequencies as high as 1500 cycles, using the same yoke and magnet structure as employed for the device operable at 60 cycles per second.

The amplitude of vibration does not significantly change the rate of vibration. A single device has been operated at such low amplitudes that actual motion could not be observed visually, and also operated at amplitudes greater than the diameter of the wire so that the central portion of the coil in Fig. 1 appeared visually as a blur. When the output of the system was connected to establish the vertical component of a pattern on a cathode ray oscilloscope, with the horizontal oscillatory component supplied by a highly stable laboratory frequency standard, upon successive variation of amplitude by control of the impulsing current, there was no significant shift of the axis of the elliptical pattern on the oscilloscope screen. Similar effects occur with the full-wave devices, with the maximum amplitude of vibration appearing at one-quarter and three-quarters of the coil length. In general, the devices have operated with stability of one part in one hundred thousand so that, for example, with a timing device required to perform a circuit closure at the end of 100 hours from zero, the present system will effect the operation within a tolerance of four seconds. Even when electrical shock excitation was externally introduced at a different frequency, and when mechanical shocks were applied, it was noted that distortion of the elliptical pattern on the oscilloscope indicated the presence of transients but, upon dissipation thereof, the original elliptical pattern returned without significant change of the axis.

Thus, the arrangement is inherently very rugged and may be employed for purposes where definite behavior is desirable along with ability to be operated by electrical sources of small weight and size, such as dry batteries, and with easy portability of the device. Thus, it can be utilized in frequency control for remote facsimile stations, for portable sirens, as a control source of audible frequency standards in piano tuning, in electronic organs, and the like. When employed in electronic organs, it has the further characteristic, when supplied with maintaining current at a regulatable intensity, of increase of amplitude at a rate determined by the prevailing strength of the impulsing current so that slow "build-up" effects of individual tones can be produced at controlled rates defined by the permitted impulsing energy, therein departing from some present-day organ systems in which the operation of the associated organ key causes an immediate emission of the intended note at maximum sound wave intensity; and correspondingly, the decrease in the mechanical vibration causes a slow "fall-off" in the note as distinguished from the immediate cessation with some present-day organ systems. Another effect obtainable is that of artificial reverberation due to this slow build-up and fall-off.

The structures have very small positional errors; they may be rotated slowly about the coil axis without significant change of frequency, in that any sagging along the length of the coil may change from one radial position to another but with the same net effect. Likewise, if the device is tilted from a horizontal axis position to a vertical axis position, the gravitational movement of coil turns is self-compensating, in that the condensation of turns toward the bottom of the coil is paralleled by a like separation of turns toward the top of the coil. Correspondingly, the device is resistant to frequency changes upon mechanical shock, even of high "G" value.

In the illustrated forms, there is essentially no variation of the magnetic field effects external to the yoke, noting that the internal permanent magnets and their flux fields are directed by the yoke and that very little energy is necessary in the coil. Hence, the unit has essentially a self-contained magnetic field with the flux contained within the unit, much as in a hedgehog transformer. In such absence of external varying magnetic fields, a number of devices can be placed close together without interaction, even though their individual frequency rates are closely related. As set out above, with the full-wave oscillator of Fig. 11, there is no mechanical interaction.

It is obvious that the illustrated forms are not restrictive and that the invention can be practiced in many ways within the scope of the appended claims.

What is claimed is:

1. A magnetomotive oscillator comprising a support, means thereon providing a magnetic field, a coil of resilient material fixed at its ends relative to the said support and having free turns between its ends which can oscillate toward and from one another, electrical connections whereby electrical impulses are generated during such oscillation in the presence of the magnetic field, an amplifier connected for responding to the pulses, and electrical connections whereby pulses are returned from the amplifier for maintaining the free turns in oscillation in the presence of the magnetic field.

2. A magnetomotive oscillator comprising a magnet, a coil of resilient conductive material secured at its ends relative to the magnet and having between its ends turns free to move toward and from one another with at least one said turn surrounding the magnet and movable within the magnetic field, and electrical connections to the coil whereby the movement of the said turn is effective to produce an alternating voltage effect at said connections.

3. A magnetomotive oscillator comprising a permanent magnet, a yoke of magnetizable material connected with an end of the magnet and having parts extending along but spaced from the same, a coil of free turns of resilient conductive material secured at one end relative to the magnet and yoke and having at least one said turn located around said magnet and within said yoke, and movable in the magnetic field therebetween, and electrical connections to the coil whereby the movement of the said turn is effective to produce an alternating voltage effect at said connections.

4. A magnet, a coil of resilient material having an end secured relative to and adjacent an end of said magnet and having free turns between the ends of the coil so that said free turns can oscillate toward and from one another, with at least one turn of said coil free to move within the field of said magnet, electrical connections whereby electrical impulses are generated during oscillations of said turn in the presence of the magnetic field, an amplifier mounted for responding to the pulses, and electrical connections whereby electrical pulses are returned from the amplifier for maintaining the free turns in oscillation in the presence of the magnetic field.

5. A magnetomotive oscillator comprising a magnet, a coil of resilient electrically conductive material secured adjacent said magnet whereby adjacent turns of the coil can move within the magnetic field, said coil having a mechanically self-determined frequency rate of axial pulsation of said turns, a source of pulsating electrical current having a frequency determining means, a connection from said source to said coil whereby to cause electrical pulses to flow therein for maintaining movement of said turns, and a connection from the coil to the said frequency determining means whereby to control the same and cause the source to operate in resonance with the mechanical frequency of the coil.

6. A magnetomotive oscillator comprising a coil of resilient electrically conductive material supported at its ends for permitted axial mechanical oscillations of free turns thereof between said ends whereby the free turns can move toward and from an end of the coil, a magnet located within the coil and having a pole between the ends of the coil whereby said turns move within the magnetic field thereof, and means whereby the magnetic interaction of the turns and magnetic field may be varied at the frequency of the mechanical oscillations of the coil.

7. A magnetomotive oscillator system comprising a magnet, a coil of resilient electrically conductive material secured adjacent the magnet whereby at least one turn of the coil can move between parts of the magnetic field having different flux densities and thereby produce a voltage effect at the ends of the coil, and an amplifier connected to the coil to be controlled by said voltage effect and connected to deliver an electric current to said coil for maintaining such movement.

8. An electromechanical vibrator comprising a closed yoke of magnetizable material, a pair of permanent magnets coaxially alined and supported relative to the yoke, and a coil of resilient electrically conductive material secured at its ends and disposed around the pair of magnets, the magnets having ends of like polarity adjacent one another and within the coil for providing a radial magnetic field effect, at least one turn of the coil being located in said magnetic field.

9. A vibrator as in claim 8, in which the yoke provides a sealed casing around the coil, and the casing space is evacuated.

10. A magnetomotive oscillator comprising a closed yoke of magnetizable material, a coil of resilient electrically conductive material located within the yoke with its ends supported relative thereto and having turns free to move resiliently in the axial direction of the coil, a permanent magnet located within the coil with its poles spaced apart in the direction of length of the coil, said poles lying between the ends of the coil.

11. An oscillator as in claim 10, in which an enclosure is located around the coil and said enclosure is evacuated.

12. An oscillator as in claim 10, in which the yoke is formed as a hollow closed body, and the space therein is evacuated.

13. An oscillator as in claim 10, in which non-magnetic spacers are connected to the magnet and to the yoke for supporting the magnet.

14. An electromechanical vibrator comprising an electrical conductor of resilient material in the form of a coil having turns free to move resiliently along the direction of the coil axis, a permanent magnet having a pole located within the coil, magnetizable material connected in supporting relation to said magnet and extending along the outside of said coil, the ends of the coil being supportedly connected to said material, and external circuit connections at the ends of the coil.

15. An electromechanical vibrator comprising an electrical conductor of resilient material in the form of a coil having turns free to move resiliently along the direction of the coil axis, magnetic means presenting one pole between the center of length of the coil and one end thereof and presenting a pole of opposite polarity between the said center of length and the other end of the coil, and circuit connections at the ends of the coil.

16. A vibrator as in claim 15 including a circuit connection to the coil at said center of length.

17. A vibrator as in claim 15, in which the magnetic means is a permanent magnet located within the coil.

18. A vibrator as in claim 15, including a yoke of magnetizable material outside the coil, the ends of the coil being mechanically supported relative to said yoke, and in which the magnetic means is a permanent magnet located within the coil, and non-magnetizable support means connecting said magnet to the yoke.

19. An electromechanical vibrator comprising a yoke of magnetizable material, a permanent magnet secured against movement relative to said yoke, an electrical conductor of resilient material in the form of a coil located between said yoke and said permanent magnet, means securing the ends of the coil against movement relative to the magnet and yoke, and external circuit connections to the ends of the coil.

20. An electromechanical vibrator comprising a yoke of magnetizable material, a permanent magnet secured against movement relative to said yoke, an electrical conductor of resilient material in the form of a coil located between said yoke and said permanent magnet, means securing the ends of the coil against movement relative to the magnet and yoke, and external circuit connections to the ends of the coil, said means including a part whereby one end of the coil may be rotated relative to the other end thereof.

21. An electromechanical vibrator comprising a yoke of magnetizable material, a permanent magnet secured against movement relative to said yoke, an electrical conductor of resilient material in the form of a coil located between said yoke and said permanent magnet, means securing the ends of the coil against movement relative to the magnet and yoke, and external circuit connections to the ends of the coil, said means including parts whereby the coil is maintained under tension.

22. An electromechanical vibrator comprising a closed yoke of magnetizable material, a permanent magnet supported within said yoke and having a pole spaced from the yoke, an electrical conductor of resilient material in the form of a coil surrounding at least a part of the magnet and having its ends insulatedly supported relative to the yoke whereby a turn of said coil is located adjacent said pole and is free to move resiliently in the magnetic field between said pole and said yoke, and external circuit connections to the ends of the coil.

23. A vibrator as in claim 22, in which two coaxial permanent magnets are provided within the yoke with poles of like polarity adjacent one another, and said turn is located adjacent said poles.

24. A vibrator as in claim 22, in which the coil has a number of axially movable turns, the magnet and the coil are so related in length and are so located within the yoke that the poles of the magnet are at one-fourth and three-fourths of the distance between the end movable turns of the coil.

25. A vibrator as in claim 24, and including two other permanent magnets arranged coaxially with the said permanent magnet, with the poles thereof arranged so that poles of like polarity are adjacent one another in the assembly.

26. A vibrator as in claim 24, including rings of magnetizable material within the yoke and closely fitting the same to define magnetic paths, said rings extending toward the coil and being in planes substantially containing said poles.

27. A vibrator as in claim 22, in which the closed yoke forms a gas-tight casing surrounding the magnet and coil, and said circuit connections are outside said casing.

28. A vibrator as in claim 27, in which the space within the casing is at a pressure of 0.2 to 0.01 millimeter of mercury.

29. A magnetomotive oscillator system, comprising an electrical conductor of resilient material in the form of a coil having turns free to move resiliently along the axis of the coil, means for establishing a magnetic field within which the turns can move whereby said movement of the turns is effective to produce voltage effects at the ends of the coil, conductors connected to the ends of the coil, electrical amplifying means connected to said conductors and controlled thereby to deliver an amplified signal back to said coil, and means included in the system for causing said signal to be effective in maintaining the motion of said turns.

30. A system as in claim 29, in which said included means comprises a transformer.

31. A system as in claim 29, in which a transformer is provided with its primary winding connected by said conductors to the coil ends, and the secondary winding is connected to the input of the amplifying means, and in which the impedance ratio of the windings is correlated to the impedances of the coil and of the said input.

32. A system as in claim 29, in which a transformer is provided with its primary winding connected by said conductor to the output of the amplifying means, and the secondary winding is connected to the coil ends, and in which the impedance ratio of the windings is correlated to the impedances of the said output and of the coil.

33. The method of producing electrical oscillations of fixed frequency, which comprises causing at least one turn of a coil of electrically conductive resilient material to vibrate at a natural frequency of the coil in the axial direction of the coil within a magnetic field whereby to produce alternating voltage effects at the ends of said turn, employing said voltage effects to produce current effects at said frequency, and imposing upon the turn at least a part of the alternating current so produced for maintaining the vibration of said turn.

34. The method as in claim 33, in which the coil is within an evacuated space.

35. The method of producing electrical oscillations of fixed frequency, which comprises causing turns of a coil of electrically conductive resilient material to vibrate at a natural frequency of the coil and in the axial direction of the coil within a magnetic field whereby to produce alternating voltage effects at said frequency at the ends of the coil, employing said voltage effects to produce current effects at said frequency, and imposing upon the coil at least a part of the alternating current so produced for maintaining the vibration thereof.

36. The method of actuating a device responsive to alternating current, which comprises causing turns of a coil of electrically conductive resilient material to vibrate at a natural frequency of the coil and in the axial direction of the coil within a magnetic field whereby to produce alternating voltage effects at said frequency at the ends of the coil, employing said voltage effects to produce current effects at said frequency, imposing upon the coil a part of the alternating current so produced for maintaining the vibration thereof, and employing another part of said current for actuating said device.

37. The method of producing electrical oscillations of a predetermined fixed frequency, which comprises supporting at its ends a coil of electrically conductive resilient material, causing at least one turn of said coil to vibrate at the natural frequency of the coil in the axial direction of the coil within a magnetic field whereby to produce alternating voltage effects at the ends of the said turn, employing the said voltage effects to produce current effects at said coil frequency, imposing upon the coil at least a part of the alternating current so produced for maintaining the vibration of said turn, and moving the ends of the coil axially relative to one another for varying the said natural frequency until the mechanical vibrations are at said predetremined frequency.

38. The method of producing electrical oscillations, which comprises causing a pair of axially spaced turns of a coil of electrically conductive resilient material to vibrate together in opposite directions at a natural mechanical frequency of the coil in the axial direction of the coil within magnetic fields oppositely directed radially relative to the respective turns whereby to produce alternating voltage effects at the ends of said coil, employing said voltage effects to produce current effects at said frequency, and imposing upon the coil at least a part of the alternating current so produced for maintaining the vibrations of said turns.

39. The method of producing electrical oscillations, which comprises causing the turns of a coil of electrically conductive resilient material to move in its second mode of vibration, maintaining magnetic field effects with flux components radial to the axis of the coil, one maximum field effect being at one-fourth of the coil length from one end thereof and another and oppositely polar effect being at one-fourth of the coil length from the other end thereof, whereby additive voltage effects are produced in said turns, employing said voltage effects to produce current effects at the frequency of said second mode of vibration, and imposing upon the coil at least a part of the alternating current so produced for maintaining the coil in said mode of vibration.

40. The method of producing electrical oscillations of fixed frequency, which comprises causing at least one turn of a coil of electrically conductive resilient material to vibrate at a natural frequency of the coil in the axial direction of the coil, establishing a radially directed magnetic field near the center of length of the coil whereby movements of said turn produce alternating voltage effects at the ends thereof, employing said voltage effects to produce current effects at said frequency, and imposing upon the turn at least a part of the alternating current so produced for maintaining the vibration of said turn.

41. The method as in claim 33, in which said voltage effects are employed to control an amplifier, and the alternating current from the output of the amplifier is imposed upon said turn.

42. The method as in claim 41, in which the output current of the amplifier is employed regeneratively in said turn.

43. The method of maintaining a coil of resilient electrically inductive material in axial vibration at a natural frequency thereof, which comprises establishing a magnetic field within which at least one turn of said coil can so vibrate whereby an alternating voltage effect is produced at the ends of said turn, employing said voltage effect to produce an alternating current effect at said frequency, and imposing at least a part of said current effect upon the coil for maintaining the vibration of said turn.

44. The method of maintaining a coil of resilient electrically conductive material in axial vibration at a natural frequency thereof, which comprises causing at least one turn thereof to vibrate axially at said frequency in a radially directed magnetic field whereby an alternating voltage effect is produced at the ends of said turn, employing said voltage effect to control an amplifying device which delivers an alternating current effect at said frequency, and imposing at least a part of said current effect upon the coil for maintaining the vibration of said turn.

45. A magnetomotive oscillator comprising a magnet, a coil of resilient electrically conductive material secured adjacent said magnet whereby at least one turn of said coil can move within the magnet field, means whereby electrical current impulses may be supplied to said coil, and a sealed enclosure around the coil, the interior of the enclosure being evacuated.

46. A magnetomotive oscillator comprising a magnet, a coil of resilient electrically conductive material secured adjacent said magnet whereby at least one turn of said coil can move within the magnet field, means whereby electrical current impulses may be supplied to said coil, a sealed enclosure around the coil, and within the enclosure a gas of lower viscosity than air.

47. A magnetomotive oscillator comprising a coil of resilient electrically conductive material supported at its end for permitted axial mechanical oscillation of free turns thereof between said ends whereby the free turns can move toward and from an end of the coil, a magnet positioned for establishing a magnetic field directed radially relative to the axis of the coil and being of varying magnetic intensity along the length of the coil and in which certain of the oscillating free turns move, and means whereby the magnetic interaction of the turns and the magnetic field may be varied at the frequency of the mechanical oscillations of the coil.

48. A magnetomotive oscillator comprising a magnet, a coil of resilient electrically conductive material insulatedly supported adjacent its ends and having turns intermediate the supported points which are free to move along the coil axis, the magnet being positioned and effective to establish a field directed radially relative to the coil axis and of differing magnetic intensities along the length of the coil, adjacent intermediate turns of the coil being located in the field of said magnet and able to move relatively toward and from one another between parts of said field having differing magnetic intensity, and means whereby electrical current pulses may be supplied to said coil.

49. A magnetomotive oscillator comprising a helical coil of resilient electrically conductive material insulatedly supported to maintain a fixed distance between its ends and having between the supported ends turns free to move resiliently toward and from one another in the axial direction of the coil, means establishing a magnetic field directed radially relative to the axis of the coil at the region of movement of a free turn, said field being of limited axial dimension and of varying intensity along the length of the coil and in the said region, and external circuit connections at the ends of said coil.

50. An electromechanical vibrator comprising a coil of resilient electrically conductive material insulatedly supported adjacent its ends and having turns intermediate the ends which are free to move resiliently toward and from one another along the coil axis, means to establish a magnetic field directed radially relative to the axis of the coil and having axially spaced parts of differing magnetic intensity and positioned relative to the coil so that the free turns can move in said magnetic field between parts thereof of different magnetic intensity whereby an electric voltage effect is produced at the ends of the coil, and external circuit connections at the ends of said coil.

51. An electromechanical vibrator comprising an electrical conductor of resilient material in the form of a coil having turns free to move resiliently toward and from one another along the direction of the coil axis, means for insulatedly supporting said coil adjacent its ends, means for establishing magnetic field effects in the paths of said free turns, said magnetic field being directed radially relative to the axis of the coil and of limited dimension along the coil axis, said field effects being of different intensities along the length of the coil, and external circuit connections at the ends of said coil.

52. An electromechanical vibrator comprising an electrical conductor of resilient material in the form of a coil having turns free to move resiliently along the direction of the coil axis, means for establishing magnetic field effects in the paths of said turns and including a magnetizable material for providing part of a magnetic circuit including said paths, the magnetic field being directed radially relative to the axis of the coil and the field effects being of differing intensities along the length of the coil at the part thereof provided by said free turns, means for insulatedly supporting the ends of the coil against movement relative to said magnetizable material, and external circuit connections to the ends of said coil.

53. An electromechanical vibrator comprising a support, an electrical conductor of resilient material in the form of a coil having turns free to move resiliently along the direction of the coil axis, means for establishing magnetic field effects in the paths of said turns, the magnetic field being directed radially relative to the axis of the coil, said field effects being of different intensities in the axial direction of the coil at the region in which said free turns move, means for insulatedly and fixedly connecting the ends of the coil to the support with the turns under initial tension, and external circuit connections at the ends of said coil.

References Cited in the file of this patent

UNITED STATES PATENTS

| 1,270,920 | Botz | July 2, 1918 |
| 2,096,867 | Thompson | Oct. 26, 1937 |
| 2,375,004 | Knowles | May 1, 1945 |
| 2,437,445 | Stack | Mar. 9, 1948 |